3,027,322
PROCESS OF PREPARING A WELL DRILLING FLUID
Harry S. Stuchell, John W. Jordan, and Richard E. Offeman, Houston, Tex., assignors to National Lead Company, New York, N.Y., a corporation of New Jersey
No Drawing. Filed July 21, 1958, Ser. No. 749,637
6 Claims. (Cl. 252—8.5)

This invention relates to a method of preparing a composition suitable for use in treating oil well drilling fluids such as are employed in the rotary method of drilling. More particularly, this invention relates to the preparation of a composition useful in controlling the viscosity of oil well drilling fluids.

It has been known for many years that tannin and humic acid containing materials and compositions prepared therefrom can be added to oil well drilling fluids to control certain of their physical properties including viscosity, gel strength and filtration rate. The use of mixtures of humic acid containing materials and caustic soda for treating drilling fluids was taught, for example, in an early article by H. C. Lawton et al. published in the May 1932 issue of "Physics." The usual way in which these drilling fluid treating compositions have been prepared is by treating a relatively dilute water slurry of ground lignite or other humic acid containing material with a solution of caustic soda. In commercial practice, this method of preparing these compositions has some obvious disadvantages, including the problems of handling large volumes of caustic solution and the necessity of evaporating large volumes of water from the reacted mixture in order to obtain a dry composition capable of being easily handled.

Previous attempts to produce drilling fluid treating compositions from lignite or other humic acid containing materials and caustic soda by a dry processing technique have been unsuccessful due largely to a failure to appreciate the necessity for controlling the moisture content of the starting material and the reaction mixtures. When too much moisture was present a semi-plastic mass formed which could not be handled in conventional types of mixing equipment. When too little moisture was present reaction did not take place and the resulting composition was a physical mixture of discrete particles of unreacted lignite and caustic soda. Such an unreacted mixture containing raw caustic soda presents a definite health hazard. This hazard is particularly apparent from the very irritating dust which is formed when the unreacted product is ground. The dust resulting from the addition of ground unreacted material to a drilling fluid is also quite objectionable. By means of the present invention the disadvantages inherent in handling large volumes of aqueous liquid are effectively avoided and the failure encountered in prior art attempts to develop a dry processing technique are overcome.

It is therefore an object of the present invention to provide a novel and economical process for preparing an alkali metal-humic acid reaction product capable of reducing the viscosity of oil well drilling fluids.

Another object of the invention is to provide an alkali metal-humic acid reaction product produced by a dry processing technique that is capable of effectively controlling the viscosity of oil well drilling fluids.

It is a further object of the invention to provide a novel and economical process for preparing an alkali metal-humic acid reaction product which avoids the necessity of handling large volumes of aqueous liquids while producing a product that is not subject to dusting during normal handling.

In its broadest aspect the present invention contemplates a process for preparing a composition useful for reducing the viscosity of well drilling fluids which comprises mixing together pulverulent humic acid containing material, e.g. lignite, having a selected moisture content between about 10 percent and 22 percent by weight with solid, pulverulent alkali metal hydroxide, simultaneously by mechanical means agitating and conveying said mixture along a substantially longitudinal axis as in a screw type conveyor for a period of time sufficient to substantially complete the reaction between the alkali metal hydroxide and the humic acid, and withdrawing the reaction product from the agitating and conveying means.

In accordance with a preferred embodiment of our invention, two to four parts by weight of a crude naturally occurring lignite that has been dried to contain approximately 18 percent moisture is mixed with one part by weight of dry granular caustic soda; the mixing operation being conducted in suitable mixing equipment which produces gentle but thorough mixing while imparting movement of the reaction mixture toward a discharge point. We have found that a lignite caustic soda mixture such as described above can be conveniently reacted on a continuous basis by the use of a slow turning standard screw conveyor. Open trough screw conveyors of the continuous, double flight or interrupted screw type are all satisfactory equipment for use in the practice of our invention. We have found that approximately sixty feet of screw conveyor is necessary to assure thorough mixing and reaction of the lignite and caustic soda. A screw conveyor of any size can be used in the practice of our invention depending upon the production capacity desired. We have found that a conveyor equipped with an eight inch diameter screw will permit us to produce approximately one ton of reacted product per hour. Predetermined proportions of the reactants can be continuously introduced at one end of the screw conveyor and a finished reacted product ready for packaging emerges from the other end of the conveyor. By adjusting the speed of the rotation of the screw and the depth of material in the conveyor, the heat of reaction and the retention time of the materials in the conveyor can be regulated to assure complete reaction of the mixture by the time it reaches the far end of the conveyor.

We have found that it is desirable to operate the screw at a speed between fifteen and thirty-five r.p.m. If the rotational speed of the screw is increased substantially above this limit the reaction is accelerated to such an extent that the reaction mixture becomes a soupy-semiplastic mass that is very difficult to move in a screw conveyor. Furthermore, if the speed of rotation of the screw is substantially greater than thirty-five r.p.m. the reactants will not have a sufficiently long retention time in the screw conveyor to assure complete reaction and still afford an opportunity for the reaction product to cool down to a suitable temperature for packaging by the time it reaches the end of the conveyor. On the other hand a speed of rotation of the screw much below fifteen r.p.m. will substantially reduce the amount of material which can be processed in a given piece of equipment. In general we have found that it is desirable to have a material retention time between twenty and thirty minutes from the time the reactants are introduced into one end of the screw convoyer until the reacted product is discharged at the far end thereof.

Various modifications of conventional screw conveyors or other continuous mixing devices may also be employed in reacting lignite and caustic soda on a continuous basis. However, for simplicity and efficient handling of materials, a conventional open trough continuous screw conveyor is the preferred equipment to be used in the practice of our invention. In general it will be desirable to position the screw conveyor at a slight angle which will require the reaction mixture to be moved up a gradual incline as it progresses towards the discharge end of the conveyor. However, under some circumstances it may prove to be advantageous to arrange one or more sections of the conveyor in an essentially horizontal position.

Any of the alkali metal hydroxides are suitable for use in carrying out this invention but because of economy and ready availability we prefer the use of sodium hydroxide. The alkali metal hydroxides useful in the practice of this invention can be anhydrous; however, this is not a requirement of the alkali metal hydroxide employed in our process. Commercially available granular, powdered or flake caustic soda, normally containing 90 percent or more NaOH has been found to be quite suitable for carrying out our invention. The term "dry" as used in reference to alkali metal hydroxides in the accompanying examples and claims is intended to include commercial grades of such materials even though they may contain some moisture.

The humic acid containing materials which can be advantageously processed according to our invention to produce an efficient drilling fluid treating composition are the carboniferous minerals that are rich in alkali extractable humic acid; such minerals include peat, lignite, lignite shale, and weathered lignite.

The amount of alkali metal hydroxide used will vary according to the degree of alkalinity desired in the product for treating specific well drilling compositions. The alkali metal hydroxide used is, however, normally in excess to that required to react with the tannin or humic acid present in the reactant, the most preferred proportions of the reactants varying between two and four parts by weight of tannin or humic acid containing material to one part alkali metal hydroxide.

The following examples are offered as evidence of the simplicity of the contemplated process for producing an efficient, easily handled drilling fluid treating composition.

Example I

Four parts by weight of crude, ground, weathered lignite mined in North Dakota and dried to contain approximately 16% moisture was mixed with one part by weight of commercial grade powdered caustic soda in an open trough screw conveyor. The reactants were fed on a continuous basis into one end of a sixty foot screw conveyor, six inches in diameter, whose screw speed was regulated to permit a retention time of the materials in the conveyor of approximately twenty minutes. Reaction of the components of the mixture was evident by the evolution of heat and water vapor. The reaction mixture developed a crumbly, granular consistency during its travel along the conveyor resulting in a substantially dry product which could be directly packaged without further treatment. It possessed high thinning efficiency when introduced directly to conventional aqueous base drilling fluids.

Example II

Two and three tenths parts by weight of ground crude weathered lignite, calculated on a dry basis, was mixed with one part by weight of dry flaked caustic soda using an open trough continuous screw conveyor. The weathered lignite had been previously dried to contain approximately 20% moisture. Reaction of the components was evident by the evolution of heat and water vapor. The reactants were fed on a continuous basis into one end of a screw conveyor of the type described in Example I to produce a granular product that was an efficient drilling mud thinner.

The drilling fluid treating composition described in this example was tested for thinning efficiency in a drilling fluid in comparison with an equal portion of the unreacted lignite and caustic soda used in preparing the composition. The samples were evaluated in a drilling fluid containing twenty-five pounds of high grade bentonite clay per barrel of aqueous fluid in accordance with suggested procedure A–IV set out in API, RP 29, Fourth Edition, May, 1957. The following values were obtained.

| Sample | Viscosity of the Drilling Fluid as Measured at 600 r.p.m. with a Standard Stormer Viscometer, centipoises | |
|---|---|---|
| | Initial Test | After 16 hours rolling at 150° F. |
| (1) Drilling fluid with no additive | 32 | 44 |
| (2) No. 1 plus 0.10 gram of caustic soda and 0.25 gram lignite per 350 ml. of drilling fluid | 28 | 42 |
| (3) No. 1 plus 0.20 gram of caustic soda and 0.50 gram lignite per 350 ml. of drilling fluid | 26 | 34 |
| (4) No. 1 plus 0.35 gram of the reacted product prepared in accordance with this example per 350 ml. of drilling fluid (Product contained 0.10 g. caustic soda + 0.25 g. lignite) | 27 | 40 |
| (5) No. 1 plus 0.70 gram of the reacted product prepared in accordance with this example per 350 ml. of drilling fluid (Product contained 0.20 gram caustic soda + 0.50 g. lignite) | 24 | 31 |

As can be seen from the above values, the reacted composition, samples 4 and 5, made in accordance with our invention is a more efficient thinner for oil well drilling fluids than an equivalent amount of the unreacted components, samples 2 and 3.

While our invention has been described and illustrated in terms of specific examples, it is not intended to be strictly limited thereto and other modifications and variations may be employed within the scope of the following claims.

Having described our invention, we claim:

1. A process of preparing a drilling fluid treating composition comprising simultaneously introducing on a uniform continuous basis between two and four parts by weight of a material containing a substantial proportion of humic acid and having between 10 and 22 percent moisture, and one part by weight of a dry alkali metal hydroxide into one end of a screw conveyor, regulating the depth of material in the conveyor and the speed of rotation of the screw to obtain complete reaction of the material during its travel along said conveyor to obtain a dry granular product.

2. A process in accordance with claim 1 wherein the humic acid containing material is weathered lignite.

3. A process in accordance with claim 1 wherein the alkali metal hydroxide is caustic soda.

4. A process of preparing a drilling fluid treating composition which comprises mixing together pulverulent material containing a substantial proportion of humic acid and having a selected moisture content between about 10 percent and 22 percent by weight with solid, pulverulent alkali metal hydroxide, simultaneously by screw conveyor means agitating and conveying said mixture along a substantially longitudinal axis, and regulating the rate of addition of said mixture to said screw conveyor means, and the rate of agitation and conveyance so that the reaction between the alkali metal hydroxide and the humic acid is substantially complete by the time the said mixture leaves the said screw conveyor means.

5. A process in accordance with claim 4, in which the material containing humic acid is lignite.

6. A process in accordance with claim 4 in which the alkali-metal hydroxide is sodium hydroxide.

References Cited in the file of this patent

UNITED STATES PATENTS

| 2,626,856 | Alles | Jan. 27, 1953 |
| 2,650,197 | Rahn | Aug. 25, 1953 |
| 2,730,539 | Bradford | Jan. 10, 1956 |
| 2,783,201 | Rahn | Feb. 26, 1957 |

OTHER REFERENCES

Riegel: Industrial Chemistry, fourth ed., 1942, Reinhold Pub. Corp., N.Y., pages 586 and 588.